(12) United States Patent
Hemmendorff

(10) Patent No.: US 8,350,752 B2
(45) Date of Patent: Jan. 8, 2013

(54) RADAR LEVEL GAUGE SYSTEM WITH BOTTOM REFLECTOR AND BOTTOM REFLECTOR

(75) Inventor: Erik Hemmendorff, Kållered (SE)

(73) Assignee: Rosemount Tank Radar AB, Goteborg (SE)

( * ) Notice: Subject to any disclaimer, the term of this patent is extended or adjusted under 35 U.S.C. 154(b) by 198 days.

(21) Appl. No.: 12/833,174

(22) Filed: Jul. 9, 2010

(65) Prior Publication Data

US 2012/0007768 A1 Jan. 12, 2012

(51) Int. Cl.
*G01S 13/08* (2006.01)
(52) U.S. Cl. .......................................................... 342/124
(58) Field of Classification Search .................... 342/124
See application file for complete search history.

(56) References Cited

U.S. PATENT DOCUMENTS

| | | | | |
|---|---|---|---|---|
| 4,489,601 | A * | 12/1984 | Rao et al. | 73/290 R |
| 4,641,139 | A * | 2/1987 | Edvardsson | 342/124 |
| 6,529,174 | B2 | 3/2003 | Stjernman et al. | 343/909 |
| 6,795,015 | B2 * | 9/2004 | Edvardsson | 342/124 |
| 7,345,622 | B2 * | 3/2008 | Edvardsson | 342/124 |
| 7,541,969 | B2 * | 6/2009 | Åkerstrom et al. | 342/124 |
| 7,586,435 | B1 * | 9/2009 | Edvardsson | 342/124 |
| 8,018,373 | B2 * | 9/2011 | Edvardsson | 342/124 |
| 2004/0099058 | A1 * | 5/2004 | Edvardsson | 73/290 V |
| 2004/0145510 | A1 * | 7/2004 | Edvardsson | 342/5 |
| 2007/0085729 | A1 * | 4/2007 | Edvardsson | 342/124 |
| 2009/0121917 | A1 * | 5/2009 | Delin et al. | 342/124 |
| 2009/0128395 | A1 * | 5/2009 | Baath | 342/124 |
| 2009/0273506 | A1 * | 11/2009 | Delin | 342/124 |
| 2010/0156702 | A1 * | 6/2010 | Edvardsson | 342/124 |

FOREIGN PATENT DOCUMENTS

| | | |
|---|---|---|
| EP | 1242794 | 9/2000 |
| EP | 1 242 794 B1 | 4/2009 |
| WO | WO 01/47065 A1 | 6/2001 |
| WO | WO 2004/068081 A1 | 8/2004 |
| WO | WO 2007/037696 A1 | 4/2007 |
| WO | WO2007/049966 | 5/2007 |
| WO | WO 2008/147300 A1 | 12/2008 |

OTHER PUBLICATIONS

International Search Report from PCT/EP2011/060305, dated Sep. 22, 2011, 4 pgs.

* cited by examiner

*Primary Examiner* — Jack W Keith
*Assistant Examiner* — Peter Bythrow
(74) *Attorney, Agent, or Firm* — Westman, Champlin & Kelly, P.A.

(57) ABSTRACT

A radar level gauge system, for determining a filling level of a product contained in a tank, the radar level gauge system comprising: a transceiver for generating, transmitting and receiving electromagnetic signals; a propagating device electrically connected to the transceiver and arranged to propagate a transmitted electromagnetic signal towards a surface of the product contained in the tank, and to return echo signals resulting from reflections at impedance transitions encountered by the transmitted electromagnetic signal, including a surface echo signal resulting from reflection at the surface, back to the transceiver; processing circuitry connected to the transceiver and configured to determine the filling level based on the surface echo signal; and a bottom reflector arranged at a bottom of the tank. The bottom reflector comprises a plurality of phase-modifying structures, each being configured to modify a phase of the transmitted electromagnetic signal and to reflect phase-modified electromagnetic signals, wherein the plurality of phase-modifying structures are arranged in such a way that phase-modified electromagnetic signals being reflected by different phase-modifying structures interact to provide destructive interference towards the propagating device.

16 Claims, 3 Drawing Sheets

RADAR LEVEL GAUGE SYSTEM WITH BOTTOM REFLECTOR AND BOTTOM REFLECTOR

TECHNICAL FIELD OF THE INVENTION

The present invention relates to a radar level gauge system for determining a filling level of a product contained in a tank. The radar level gauge system comprises a bottom reflector arranged at a bottom of the tank. The present invention also relates to a bottom reflector for use in a radar level gauge system.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the phase difference between a transmitted frequency-modulated signal and its reflection at the surface. The latter type of systems is generally referred to as being of the FMCW (Frequency Modulated Continuous Wave) type.

Many products, in particular liquids, are at least to some extent transparent to the electromagnetic signals in the frequency range typically used in radar level gauge systems, which may possibly cause electromagnetic signals reflected from the bottom of the tank to interfere with the electromagnetic signals reflected from the surface of the product when measuring low filling levels, i.e. the distance resolution may be insufficient to distinguish the electromagnetic signals reflected from the bottom of the tank from those reflected from the surface of the liquid.

EP 1 242 794 discloses a radar level measuring device having an absorber for microwave signals positioned at the base of the tank. Through this absorber, the reflection at the bottom of the tank can be considerably reduced, which allows measurement of low filling levels. In the radar level measurement device according to EP 1 242 794, the absorber is provided in the form of a connected plate of spikes where the tips of the spikes point in the direction of the incident microwaves. The spikes are made of a material which has a good absorption capacity for microwaves. Although the absorber according to EP 1 242 794 allows measurement of lower filling levels than was previously possible, the extension from the bottom of the tank to the top of the absorber limits the lowest filling level that can be measured to in the order of at least one wavelength of the microwave signals. As the frequency range of radar level gauging systems is typically in the order of tenths of gigahertz, the wavelength is in the order of a few centimeters.

SUMMARY OF THE INVENTION

In view of the above-mentioned and other drawbacks of the prior art, it is an object of the present invention is to provide an improved radar level gauge system, and in particular a radar level gauge system enabling accurate measurements of lower filling levels.

According to a first aspect of the present invention, it is therefore provided a radar level gauge system, for determining a filling level of a product contained in a tank, the radar level gauge system comprising a transceiver for generating, transmitting and receiving electromagnetic signals; a propagating device electrically connected to the transceiver and arranged to propagate a transmitted electromagnetic signal towards a surface of the product contained in the tank, and to return echo signals resulting from reflections at impedance transitions encountered by the transmitted electromagnetic signal, including a surface echo signal resulting from reflection at the surface, back to the transceiver; processing circuitry connected to the transceiver and configured to determine the filling level based on the returned surface echo signal; and a bottom reflector arranged at a bottom of the tank, the bottom reflector comprising a plurality of phase-modifying structures, each being configured to modify a phase of the transmitted electromagnetic signal and to reflect a phase-modified electromagnetic signal, wherein the plurality of phase-modifying structures are arranged in such a way that phase-modified electromagnetic signals being reflected by the phase-modifying structures interact to provide destructive interference towards the propagating device.

The tank may be any container or vessel capable of containing a product, and may be metallic, or partly or completely non-metallic, open, semi-open, or closed. The generated, transmitted and received electromagnetic signals are typically microwave signals. The propagating device may be any device capable of directing electromagnetic signals from and towards the transceiver.

The propagating device may be configured to radiate electromagnetic signals into free space, or be arranged to co-operate with a waveguide structure arranged to guide the radiated electromagnetic signals.

Examples of propagating devices include horn antennas, rod antennas, patch antennas and array antennas. In some applications, such as in so-called floating roof tanks, the propagating device(s), typically an antenna, is often referred to as mode converter or mode generator.

The present invention is based on the realization that disturbances caused by reflections at the bottom of the tank can be reduced while using a thinner structure compared to what is previously known, thereby enabling measurements of lower filling levels than was previously possible. In a bottom absorber as described in EP 1 242 794, a certain volume of material is required to sufficiently absorb an incident microwave signal, thereby implying a certain vertical extension of the bottom absorber. The present inventor has now realized that the same effect of reducing disturbances from bottom reflections can be achieved by using a bottom reflector based on a different physical phenomena, namely reflection and interference, where each of a plurality of phase-modifying structures receives and then transmits a phase-modified version of the transmitted electromagnetic signal. Since the process of reflection and interference does not rely on absorption, there is no need for a certain volume of material, thereby making it possible to reduce the thickness of the reflecting structure. The reduced reflections are achieved by introducing phase modifying structures located at the bottom of the tank, the phase modifying structures being designed and arranged so as to achieve destructive interference of the reflected signal in the direction of the signal propagating device. Thus, the present invention offers the possibility to measure even lower filling levels as the vertical extension of a bottom reflector comprising phase modifying structures can be made as thin as a few millimeters. This property may be particularly useful for a radar level gauge system for use in a tank on a ship, especially on a ship for carrying Liquefied Natural Gas (LNG). The reflection from an LNG surface is relatively weak, and, furthermore, high precision also for low filling levels is normally required for so-called Custody Transfer when ships are loaded and unloaded.

By appropriate design of the individual structures, the resulting degree of phase modification from each structure can be controlled. Also, the frequency range of the electromagnetic signals is one of the parameters to consider when designing the phase modifying structures, and one skilled in the relevant art can readily adapt the design to a desired frequency range Destructive interference occurs when the plurality of phase modifying structures are designed and arranged with respect to the transmitted electromagnetic signal and to each other so that the reflected phase-modified electromagnetic signals have different phases. The phase-modified electromagnetic signals interact and cause destructive interference so as to reduce the amplitude of the signal in the desired direction (towards the propagating device).

In various embodiments, the radar level gauge system according to the present invention may comprise a substantially vertical tube arranged to guide the transmitted electromagnetic signal towards the surface of the product contained in the tank, and to guide the surface echo signal back from the surface, the substantially vertical tube having an inner diameter and being arranged such that an open end of the substantially vertical tube is provided above the bottom reflector and distanced from the bottom reflector by a minimum distance.

In such embodiments, the phase-modifying structures of the bottom reflector may advantageously be arranged and configured in such a way that less power is reflected back into the open end of the substantially vertical tube than is reflected back outside the substantially vertical tube. For example, the phase-modifying structures may then be configured to provide a radiation pattern with destructive interference within a cone defined by the inner diameter of the substantially vertical tube and the minimum distance between the bottom reflector and the open end of the substantially vertical tube.

The bottom reflector may be a substantially planar structure.

Moreover, the bottom reflector may advantageously be placed in a plane substantially parallel to the bottom of the tank, at the bottom of the tank, thereby minimizing the vertical extension of the bottom reflector.

According to one embodiment of the invention, each phase-modifying structure may comprise a first electrically floating conducting element, with the plurality of first electrically floating conducting elements being mutually spaced apart in a first element plane.

Here, each of the first electrically floating conducting elements acts as an antenna, receiving the transmitted electromagnetic signal and transmitting in response a phase-modified electromagnetic signal. The electrically floating elements can be made thin, for example by etching them from a conducting film or through deposition methods such as sputtering or evaporation, resulting in sub-millimeter thick elements.

The electrically floating elements may have many different shapes. However, using rectangular elongate elements may facilitate design and modeling of the plurality of elements in an element array.

Furthermore, the bottom reflector may advantageously comprise a conducting layer arranged in parallel with the first element plane and conductively insulated from the first element plane. Additionally the bottom reflector may be arranged such that the first element plane is closer than the conducting layer to the propagating device. In other words, such that the first element plane faces the propagating device. By providing a conducting layer acting as a ground plane arranged at a distance from the first electrically floating elements, design of the bottom reflector is facilitated, since relations and modeling methods used in microwave antenna design can be used. Such models are, for example, provided in U.S. Pat. No. 6,529,174, which is hereby incorporated by reference.

Alternatively, in the case where the bottom of the tank in which the bottom reflector is placed is made of a conducting material, the bottom of the tank can act as the conducting layer in the phase modifying device.

Furthermore, the insulating material arranged between the conducting layer and the first element plane may preferably be a dielectric material. Additionally, selecting a dielectric material with a relatively high dielectric constant can make it possible to reduce the thickness of the insulating layer, thereby reducing the total thickness of the bottom reflector. Suitable insulators may for example be found among polytetrafluoroethylene—(PTFE) based materials.

In one embodiment of the present invention, each of the phase modifying structures may comprise a second electrically floating conducting element, the plurality of the second electrically floating conducting elements being mutually spaced apart and arranged in a second plane. Moreover, the second element plane may be arranged in parallel with the first element plane and may be electrically insulated from the first element plane. Having elements positioned in at least two planes provides the option of having electromagnetically interacting elements in the vertical direction without the elements being in direct conductive contact. This interaction between elements allows for a wider range of options when designing the elements and the layout of the array for the desired reflection pattern.

In some cases, it may be desirable to receive a detectable reference reflection signal from which the distance to the bottom of the tank can be deduced, to allow for detection when the level of the product in the tank is approaching the bottom, and/or for allowing use of the bottom of the tank as a reference marker.

To that end, the bottom reflector may be configured to provide for a reference reflection signal being detectable by the radar level gauge system. This may be achieved in numerous ways. For example, the phase-modifying structures may be arranged so as to provide reflection of a controlled portion of the transmitted electromagnetic signal towards the propagating device.

Alternatively, or in combination, the bottom reflector may be configured to allow a portion of the transmitted electromagnetic signal to be reflected directly by the bottom of the tank.

This may, for example, be achieved by configuring and/or arranging the bottom reflector in such a way that it does not cover the entire surface area of the bottom of the tank on which the transmitted electromagnetic signal impinges.

One way of achieving this is to provide the bottom reflector with an opening formed therein to allow a portion of the transmitted electromagnetic signal to be reflected directly by the bottom of the tank.

According to a second aspect of the present invention, there is provided a bottom reflector for use in a radar level gauge system, for determining a filling level of a product contained in a tank, the radar level gauge system comprising: a transceiver for generating, transmitting and receiving electromagnetic signals; a propagating device electrically connected to the transceiver and arranged to propagate a transmitted electromagnetic signal towards a surface of the product contained in the tank, and to return echo signals resulting from reflections at impedance transitions encountered by the transmitted electromagnetic signal, including a surface echo signal resulting from reflection at the surface, back to the transceiver; processing circuitry connected to the transceiver and configured to determine the filling level based on the surface echo signal, the bottom reflector comprising a plurality of phase-modifying structures, each being configured to modify a phase of the transmitted electromagnetic signal and to reflect phase-modified electromagnetic signals, wherein the plurality of phase-modifying structures are arranged in such a way that phase-modified electromagnetic signals being reflected by different phase-modifying structures interact to provide destructive interference in a direction perpendicular to the bottom reflector.

Moreover, the plurality of phase-modifying structures may be arranged and configured to distribute the power reflected by the bottom reflector in a plurality of directions.

For example, the plurality of phase-modifying structures may be arranged and configured to provide a reflection pattern being substantially rotationally symmetric in respect of a normal to the bottom reflector.

BRIEF DESCRIPTION OF THE DRAWINGS

These and other aspects of the present invention will now be described in more detail with reference to the appended drawings showing a currently preferred embodiment of the invention, wherein.

DETAILED DESCRIPTION OF AN EMBODIMENT OF THE INVENTION

In the present detailed description, various embodiments of the radar level gauge system according to the present invention are mainly discussed with reference to a radar level gauge system, in which an electromagnetic signal is propagated towards the product contained in the tank through a waveguide, such as a vertically aligned metal tube arranged within the tank. Furthermore, the radar level gauge system is illustrated as being provided to a land-based tank.

It should be noted that the present invention by no means is limited to this particular embodiment, but is equally applicable to radar level gauge systems in which no such waveguide is used, but the electromagnetic signals are propagated towards the product contained in the tank using a free radiating antenna, such as a cone antenna, a horn antenna, an array antenna, a rod antenna or a patch antenna. Furthermore, the present invention is not limited to radar level gauge systems for use in land-based tanks. On the contrary, it is expected that the radar level gauge system according to various embodiments of the present invention will be very useful for use in tanks on ships.

Figure 1:
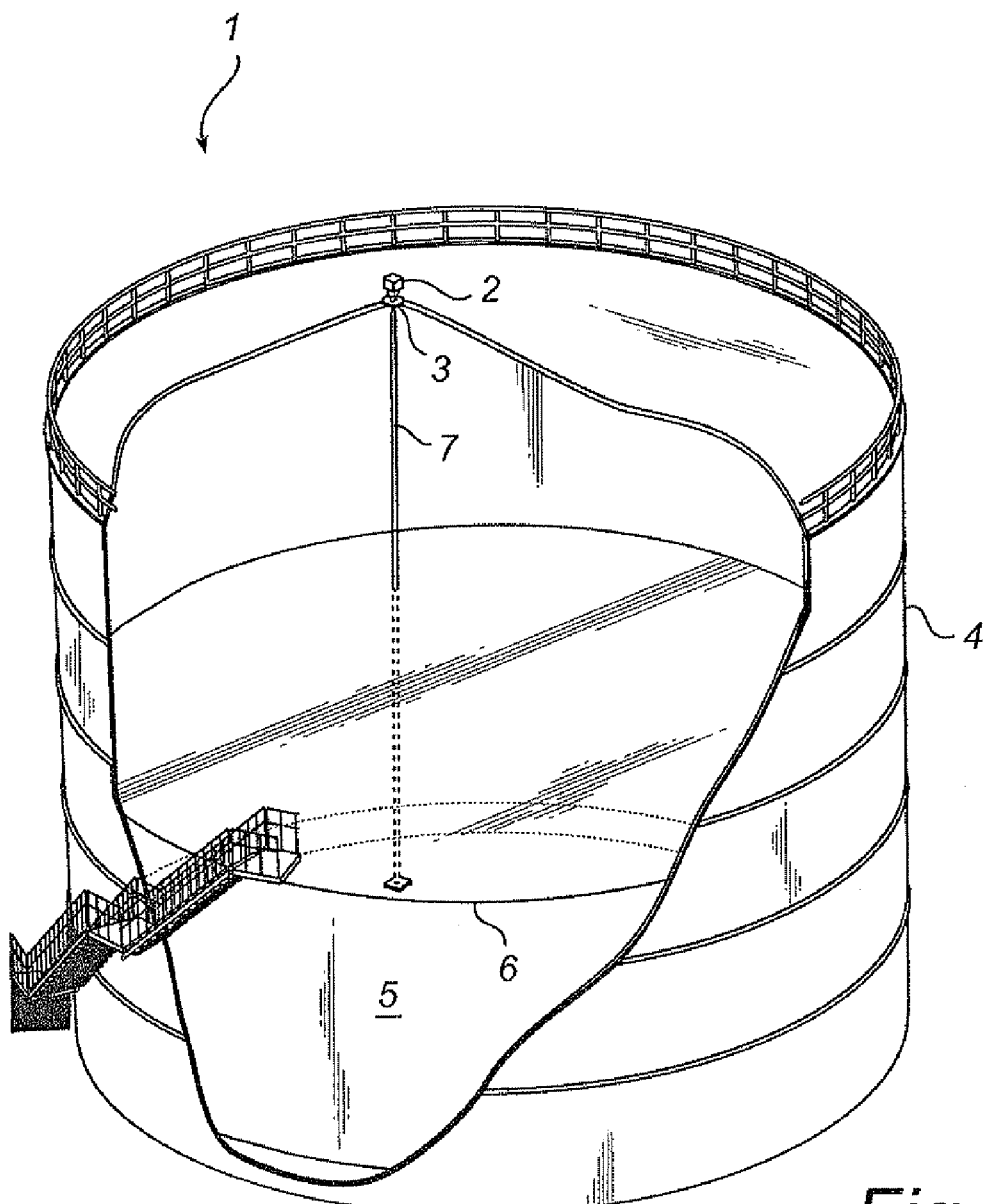
FIG. 1 schematically illustrates a radar level gauge system according to an embodiment of the present invention.

FIG. 1 schematically illustrates a radar level gauge system 1 according to an embodiment of the present invention, comprising a measurement electronics unit 2, and a propagation device in the form of a radiating antenna device 3 arranged inside a vertically aligned metal tube 7 acting as a waveguide (such a vertically aligned metal tube 7 is sometimes referred to as a so-called still-pipe). The metal tube 7 may advantageously be made of steel. The radar level gauge system 1 is provided on a tank 4, which is partly filled with a product 5 to be gauged. By analyzing a transmission signal being radiated by the antenna device 3 towards the surface 6 of the product 5, and a reflected signal traveling back from the surface 6, the measurement electronics unit 2 can determine the distance between a reference position and the surface 6 of the product 5, whereby the filling level can be deduced. It should be noted that, although a tank 4 containing a single product 5 is discussed herein, the distance to any material interface that may be present in the tank 4 can be measured in a similar manner.

Figure 2A:
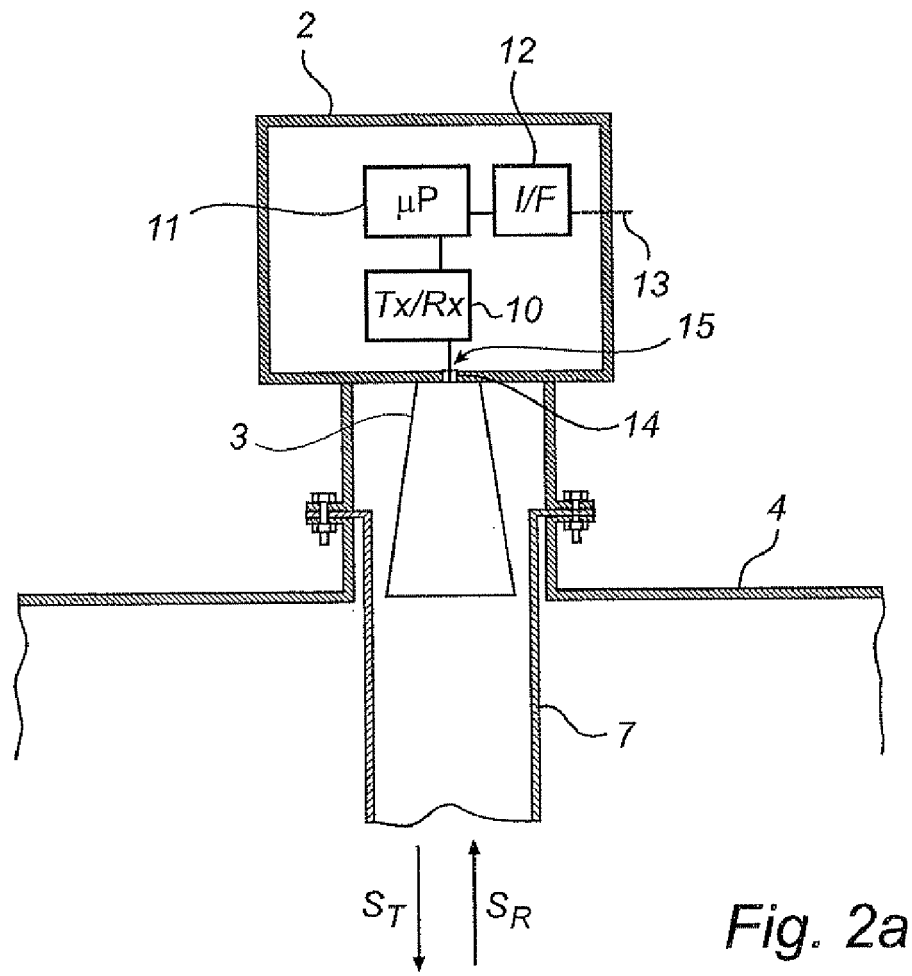
FIG. 2a is a schematic illustration of a measurement electronics unit comprised in the radar level gauge system in FIG. 1.

As is schematically illustrated in FIG. 2a, the electronics unit 2 comprises a transceiver 10 for transmitting and receiving the electromagnetic signals $S_T$ and $S_R$, respectively, a processing unit 11, which is connected to the transceiver 10 for control of the transceiver and processing of signals received by the transceiver to determine the filling level of the product 5 in the tank 4.

The processing unit 11 is, furthermore, connectable to external communication lines 13 for analog and/or digital communication via an interface 12. Moreover, although not shown in FIG. 2a, the radar level gauge system 1 is typically connectable to an external power source, or may be powered through the external communication lines 13. Alternatively, the radar level gauge system 1 may be powered locally, and may be configured to communicate wirelessly.

Although being shown as separate blocks in FIG. 2a, several of the transceiver 10, the processing circuitry 11 and the interface 12 may be provided on the same circuit board.

In FIG. 2a, furthermore, the transceiver 10 is illustrated as being separated from the interior of the tank 4 and connected to the antenna device 3 via a conductor 14 passing through a feed-through 15 provided in the tank wall. It should be understood that this is not necessarily the case, and that at least the transceiver 10 may be provided in the interior of the tank 4.

Figure 2B:
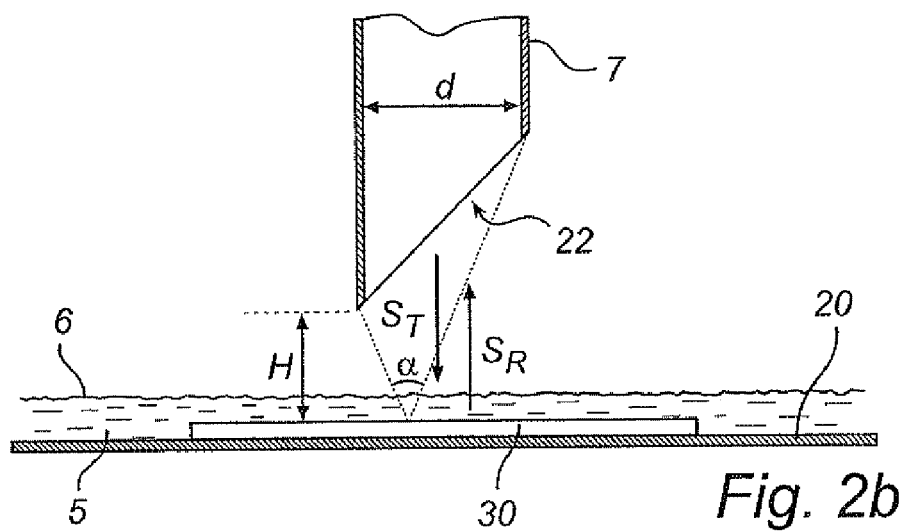
FIG. 2b schematically illustrates a region at the bottom of the tank for the radar level gauge system in FIG. 1, in a case where there is a low filling level.

FIG. 2b schematically illustrates a region at the bottom 20 of the tank 4 for the radar level gauge system 1 in FIG. 1, in a case where there is a low filling level, that is, when the surface 6 of the product 5 contained in the tank 4 is close to the bottom 20 of the tank 4.

In FIG. 2b, it can be seen that a bottom reflector 30 is arranged below the open end 22 of the metal tube 7. The metal tube 7 has an inner diameter d and is angled at the open end 22 to reduce reflections of the transmitted electromagnetic signal $S_T$ at the open end 22 of the metal tube 7. The metal tube may, for example, be angled about 45° at the open end 22.

As can also be seen in FIG. 2b, the open end 22 of the metal tube 7 is distanced from the bottom reflector 30 by a distance H. The distance H may advantageously be selected so as to ensure that the metal tube 7 does not hit the bottom reflector 30 at any temperature in the operating range of the radar level gauge system. For some applications, the temperature range may be rather large, resulting in substantial elongation/contraction of the metal tube 7.

To allow for an undisturbed measurement of the filling level when the surface 6 of the product 5 contained in the tank 4 is as low as is schematically indicated in FIG. 2b, the bottom reflector 30 may advantageously be configured to provide a reflection pattern with a lower intensity towards the open end 22 of the metal tube 7 than outside the metal tube 7. When designing the bottom reflector 30 to achieve such a reflection pattern, the distance H to the open end 22 of the metal tube 7 and the inner diameter d of the metal tube 7 should be considered. In the exemplary embodiment illustrated in FIG. 2b, the bottom reflector 30 may then advantageously be configured to provide a radiation pattern with destructive interference within a cone defined by the opening angle α in FIG. 2b. This opening angle is approximately given by the following relation:

$$\alpha = 2 \times \tan^{-1} \frac{d/2}{\frac{d}{2} + H}$$

Such a radiation pattern (or another radiation pattern that may be considered advantageous for a particular radar level gauge system) can be achieved by appropriate design and arrangement of phase-modifying structures comprised in the bottom reflector 30. Such phase-modifying structures are not visible in FIG. 2b, but will be described in more detail below together with principles for the configuration and arrangement of exemplary phase-modifying structures.

It should, furthermore, be noted that FIG. 2b is not drawn to scale. In particular, the height of the bottom reflector 30 may typically be considerably smaller than the thickness of the bottom 20 of the tank 4.

Figure 3:
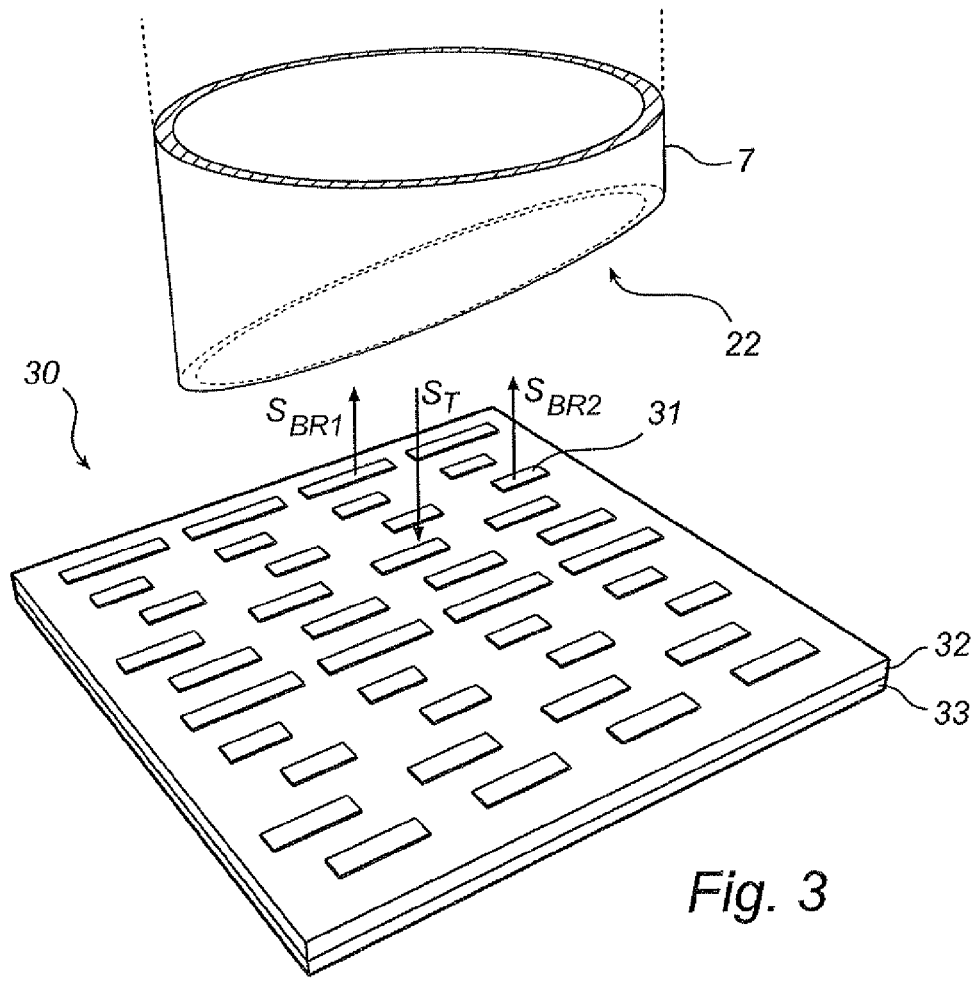
FIG. 3 schematically illustrates a bottom reflector comprised in the radar level gauge system in FIG. 1.

FIG. 3 schematically illustrates an exemplary bottom reflector 30 comprising a plurality of electrically floating conducting elements 31 on an intermediate insulating layer 32 arranged on a conducting ground plane 33, where the conducting ground plane is acting as a reflecting section for microwaves.

While the shown bottom reflector 30 is substantially quadratic, it may equally well have other shapes such as circular or rectangular. Furthermore, the size of the bottom reflector may vary considerably; from a plate with a size comparable to the size of the opening of the tube-like waveguide 7 shown in FIG. 1, to a plate which covers a substantial portion of the bottom of the tank, which may be the case in a free-space radiating radar level gauge system. In a free-radiating system the required size of the bottom reflector is determined by the distance between the radiating antenna and the bottom reflector and the lobe-width of the antenna.

In the illustration in FIG. 3 the shapes of the electrically floating conducting elements 31, henceforth called dipoles, are rectangular and elongate. Furthermore, in FIG. 3 only one conducting element 31 is labeled in order to avoid cluttering the figure, it should be understood that 31 represents each of the plurality of conducting elements. However the shapes of the dipoles may vary both within the same array and/or between bottom reflectors for different embodiments. It is the desired reflecting pattern which determines the size, shape and distribution of dipoles as will be outlined in more detail in the following.

According to one illustrative example, an elemental dipole scatterer consists of a dipole positioned approximately ⅛ wavelength above a ground plane. It should be understood that it is the electrical distance which is relevant and that the electrical distance is dependent both on the dielectric constant of the intermediate insulating layer and on the frequency of the electromagnetic wave. Incident RF electromagnetic waves cause a standing wave to be set up between the dipole and the ground-plane. The dipole itself possesses an RF reactance which is a function of its length and thickness, and the combination of standing wave and dipole reactance causes the incident RF signal to be reradiated with a phase shift, which can be controlled by a variation of the dipole's dimensions.

The exact value of the this phase shift is a function of the dipole length, the dipole thickness, its distance from the ground-plane, the dielectric constant of the insulating layer, and the angle of the incident RF electromagnetic wave. When the element is used in an array it is also affected by nearby dipoles. Dipole lengths may vary over the range of 0.25 to 0.60 wavelengths to achieve a full 360° range of phase shifts. The ideal spacing between the conducting ground plane and the dipole plane is 1/16 to ⅛ wavelengths. However, other spacings may also be used to reach satisfactory results. The spacing affects form factor, bandwidth and sensitivity to fabrication tolerances.

Since dipoles of different lengths will produce different phase shifts in the incident wave, arranging the distribution and the lengths of the dipoles will serve to steer, focus or shape the reflected wave.

Referring again to FIG. 3, the incident signal $S_T$ is phase shifted by each of the dipoles and re-radiated resulting in a far-field pattern where the total reflected signal $S_R$ can be understood as $$S_R = \sum_{x=1}^{n} S_{BRx}$$

where $S_{BRx}$ is a reflected signal from each of the dipoles. The far-field is loosely defined as the region where the angular distribution of the transmitted signal is independent of distance from the antenna, and the radar level gauge system is arranged so that the propagating device is in the far-field region. The far-field pattern is derived by multiplying the dipole radiation by the reflectors array factor and a dipoles' element factor as $$E_{farfield} = E \times Array\ factor \times Element\ factor$$

where E is the field radiated at each dipole. The array factor is calculated using inverse Fourier transforms on an array wherein each element contains the radiation from a single dipole. Since the array consists of several different dipole lengths, the element factor for a dipole of medium length may be used. Furthermore, the element factor depends on the distance between the dipole and the ground plane. Calculations of the required size and distribution of dipoles for a desired reflection pattern is preferably performed using a suitable computer program.

Figure 4:
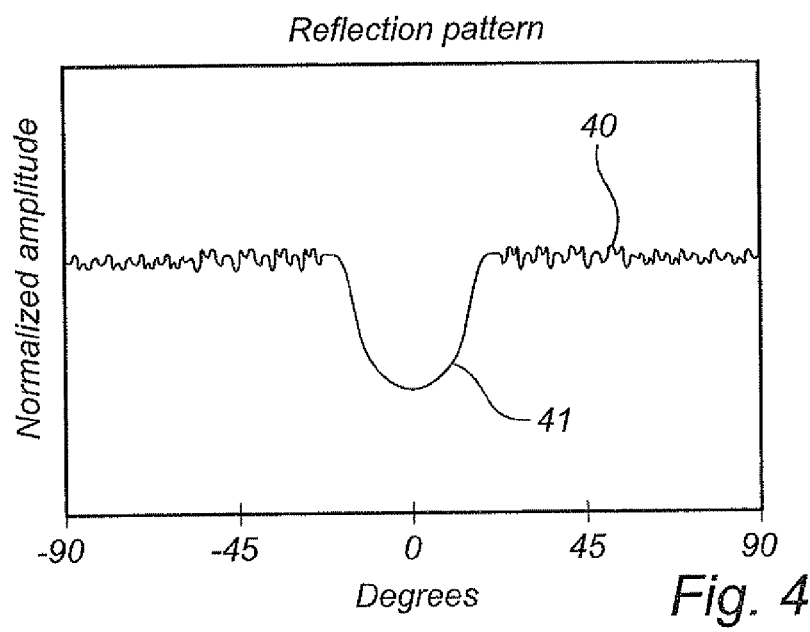
FIG. 4 is a schematic illustration of a reflected signal having normalized amplitude.

FIG. 4 schematically illustrates an exemplary reflection pattern 40 from a bottom reflector where the lower amplitude in the center of the graph 41 corresponds to a damping of the reflected electromagnetic signal. Here, the reflected pattern is shown with normalized amplitude in a Cartesian coordinate system where '0' denotes the reflection direction orthogonal to the bottom reflector 30. As can be seen in FIG. 4, the bottom reflector 30 is configured to distribute the power reflected thereby in a plurality of directions. In fact, the reflection pattern provided by the bottom reflector 30 is rotationally symmetric in respect of a normal of the bottom reflector 30, in order to reflect substantially less power into the open end 22 of the metal tube 7 than outside the metal tube 7.

The person skilled in the art realizes that the present invention is by no means limited to the preferred embodiments described above. For example, other configurations and/or arrangements of the phase-modifying structures comprised in the bottom reflector are possible. For instance, the phase-modifying structures may be configured and arranged to reflect the main portion of the incident power in a plurality of distinct directions rather than to more or less evenly distribute the reflected power as is schematically illustrated in FIG. 4. Moreover, although the open end 22 of the metal tube 7 is illustrated as being angled herein, this may not necessarily be the case, but depending on application, the open end may be perpendicular to the principal extension of the metal tube 7.

What is claimed is:

1. A radar level gauge system, for determining a filling level of a product contained in a tank, said radar level gauge system comprising:
    a transceiver for generating, transmitting and receiving electromagnetic signals;
    a propagating device electrically connected to said transceiver and arranged to propagate a transmitted electromagnetic signal towards a surface of the product contained in the tank, and to
    return echo signals resulting from reflections at impedance transitions encountered by the transmitted electromagnetic signal, including a surface echo signal resulting from reflection at said surface, back to said transceiver;
    processing circuitry connected to said transceiver and configured to determine said filling level based on said surface echo signal; and
    a bottom reflector arranged at a bottom of said tank, the bottom reflector comprising a plurality of phase-modifying structures, each being configured to modify a phase of said transmitted electromagnetic signal and to reflect phase-modified electromagnetic signals,
    wherein the plurality of phase-modifying structures are arranged in such a way that phase-modified electromagnetic signals being reflected by different phase-modifying structures have different phases such as to interact to provide destructive interference towards said propagating device.

2. The radar level gauge system according to claim 1, comprising a substantially vertical tube arranged to guide the transmitted electromagnetic signal towards said surface of the product contained in the tank, and to guide the surface echo signal back from said surface,
    said substantially vertical tube having an inner diameter and being arranged such that an open end of said substantially vertical tube is provided above said bottom reflector and distanced from said bottom reflector by a minimum distance.

3. The radar level gauge system according to claim 2, wherein said phase-modifying structures of the bottom reflector are arranged and configured in such a way that less power is reflected back into said open end of the substantially vertical tube than is reflected back outside said substantially vertical tube.

4. The radar level gauge system according to claim 1, wherein the bottom reflector is a substantially planar structure.

5. The radar level gauge system according to claim 4, wherein the bottom reflector is arranged in a plane substantially parallel with the bottom of said tank.

6. The radar level gauge system according to claim 3, wherein the bottom reflector is arranged in a plane being substantially perpendicular to said substantially vertical tube.

7. The radar level gauge system according to claim 4, wherein each of said phase-modifying structures comprises a first electrically floating conducting element, said first electrically floating conducting elements being mutually spaced apart in a first element plane.

8. The radar level gauge system according to claim 7, wherein said bottom reflector further comprises a conducting layer arranged in parallel with said first element plane and conductively insulated from said first element plane, said bottom reflector being arranged such that said first element plane is closer than said conducting layer to said propagating device.

9. The radar level gauge system according to claim 8, wherein said bottom reflector further comprises a layer of a dielectric material being arranged between said conducting layer and said first element plane.

10. The radar level gauge system according to claim 7, wherein each of said phase-modifying structures further comprises a second electrically floating conducting element, said second electrically floating conducting elements being mutually spaced apart in a second element plane,
    the second element plane being arranged in parallel with said first element plane and conductively insulated from said first element plane.

11. The radar level gauge system according to claim 1, wherein said bottom reflector is configured to provide for a reference reflection signal being detectable by said radar level gauge system.

12. The radar level gauge system according to claim 11, wherein said bottom reflector is configured to allow a portion of said transmitted electromagnetic signal to be reflected directly by said bottom of the tank.

13. The radar level gauge system according to claim 12, wherein said bottom reflector has an opening formed therein to allow said portion of the transmitted electromagnetic signal to be reflected directly by said bottom of the tank.

14. A bottom reflector for use in a radar level gauge system, for determining a filling level of a product contained in a tank, said radar level gauge system comprising:
    a transceiver for generating, transmitting and receiving electromagnetic signals;
    a propagating device electrically connected to said transceiver and arranged to propagate a transmitted electromagnetic signal towards a surface of the product contained in the tank, and to return echo signals resulting from reflections at impedance transitions encountered by the transmitted electromagnetic signal, including a surface echo signal resulting from reflection at said surface, back to said transceiver;
    processing circuitry connected to said transceiver and configured to determine said filling level based on said surface echo signal,
    said bottom reflector comprising a plurality of phase-modifying structures, each being configured to modify a phase of said transmitted electromagnetic signal and to reflect phase-modified electromagnetic signals, wherein the plurality of phase-modifying structures are arranged in such a way that phase-modified electromagnetic signals being reflected by different phase-modifying structures have different phases such as to interact to provide destructive interference in a direction perpendicular to said bottom reflector.

15. The bottom reflector according to claim 14, wherein said plurality of phase-modifying structures are arranged and configured to distribute the power reflected by the bottom reflector in a plurality of directions.

16. The bottom reflector according to claim 15, wherein said plurality of phase-modifying structures are arranged and configured to provide a reflection pattern being substantially rotationally symmetric in respect of a normal to said bottom reflector.

* * * * *